United States Patent
Siard et al.

[11] 3,712,784
[45] Jan. 23, 1973

[54] APPARATUS FOR BLOW MOLDING A PREFORM IN A MOLD WITH A STERILE GAS

[76] Inventors: Michael Siard, 2, Route du Cap, 76 Sainte Adresse; Daniel Pellerin, 11, rue J. Siegfried, 76 Le Havre, both of France

[22] Filed: March 26, 1971

[21] Appl. No.: 128,469

[30] Foreign Application Priority Data

Mar. 27, 1970 France..........................7011123

[52] U.S. Cl. ..........................425/387, 21/91, 21/94, 23/290, 134/166 R, 141/90, 264/94, 425/326
[51] Int. Cl. .............................................B29d 23/03
[58] Field of Search ........425/326, 387, 472; 23/290; 21/91, 94, 95, 96, 97, 98, 124; 141/90; 134/102, 166 R, 171, 169 R; 264/96, 94, 98

[56] References Cited

UNITED STATES PATENTS

| | | | |
|---|---|---|---|
| 2,629,148 | 2/1953 | Kollsman | 21/96 X |
| 3,351,980 | 11/1967 | Hehl | 425/326 |
| 3,359,062 | 12/1967 | Palm | 141/90 X |
| 3,479,793 | 11/1969 | Euers | 264/98 X |
| 3,577,279 | 5/1971 | Lightner et al. | 134/23 |

*Primary Examiner*—J. Spencer Overholser
*Assistant Examiner*—Brian P. Ross
*Attorney*—Waters, Roditi, Schwartz & Nissen

[57] ABSTRACT

A needle is retracted into a sterilization chamber where it undergoes heating to a sterilization temperature while a sterile gas is passed through the needle. The sterilized needle is then passed to a position above a mold and the needle is then extended to pierce a preform in the mold and blow the preform in the mold.

4 Claims, 2 Drawing Figures

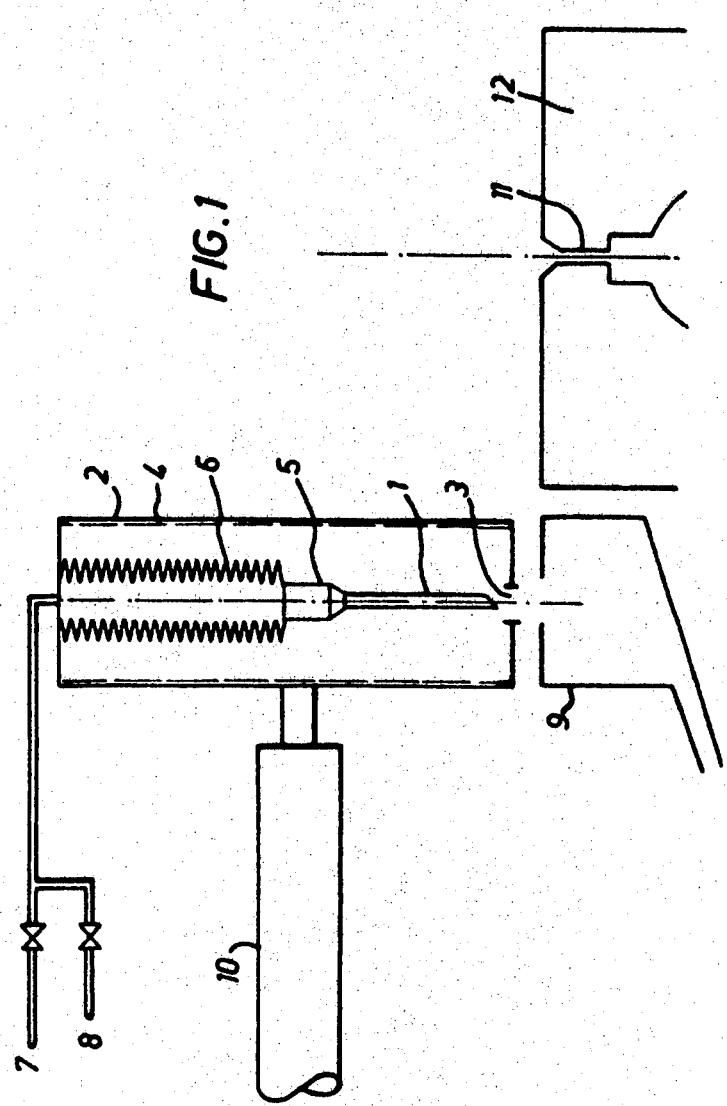

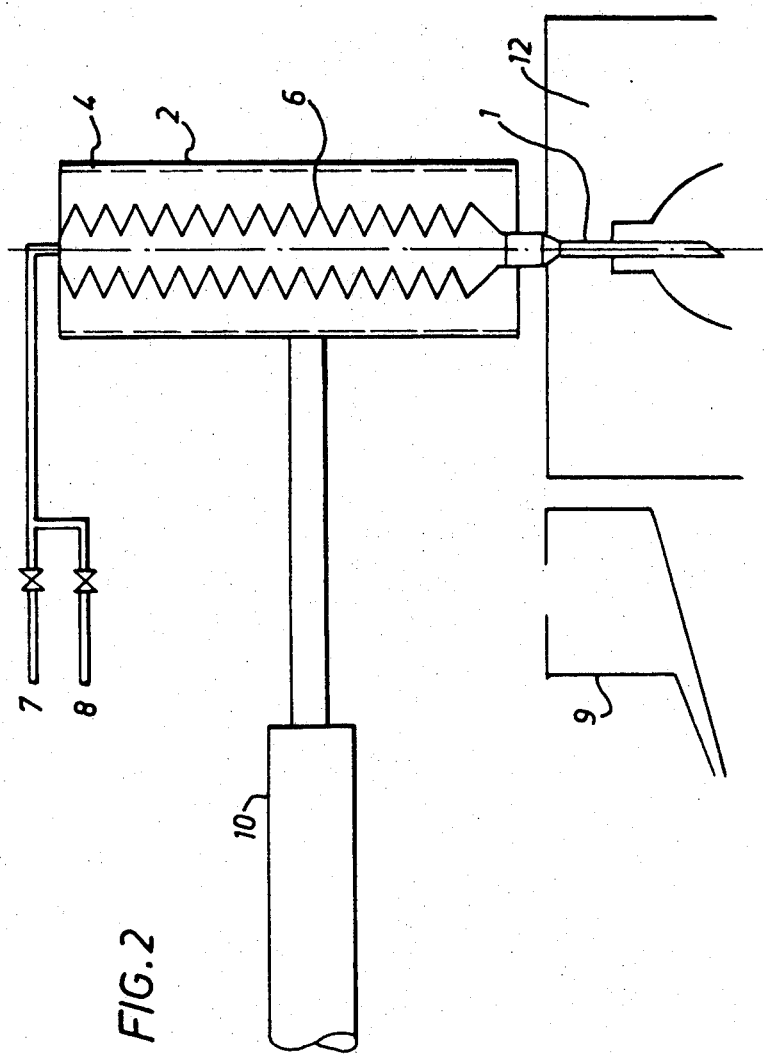

APPARATUS FOR BLOW MOLDING A PREFORM IN A MOLD WITH A STERILE GAS

BRIEF SUMMARY OF THE INVENTION

The present invention relates to the sterilization of a hollow needle, such as used in the blowing of sealed and sterile hollow plastic bodies such as bottles.

The manufacture of hermetically sealed sterile bottles by extrusion from a preform and subsequent blowing of the preform in a mold is applicable to various branches of industry and especially the food and pharmaceutical industries. The manufacturing process employed comprises extruding through a circular die a tubular preform closed at its free end in order to avoid contamination from the atmosphere, the material thereof being raised to a sufficiently high temperature and for a period long enough to ensure thorough destruction of any bacteria and microorganisms that may be present therein. After having been closed at its other end in aseptic conditions, such preform is next transferred to a chilled mold in which it is blown i.e. injected with a sterile gas and cooled.

To preserve the sterility of the preform, the blowing thereof in the mold must be effected with a sterile fluid introduced by means of a likewise sterile needle.

An object of the invention is to provide apparatus by which the needle used in the manufacture of a hollow body by extrusion and blowing is subjected to sterilization before each injection of the hollow body with a gas.

Another object of the invention is to provide apparatus allowing repeated sterilization of the blowing needle.

The needle-sterilization operation must be repeated after every blowing operation, since parts connected to the needle are exposed to the atmosphere during the blowing. Also, after blowing and cooling of the preform, the needle also comes into contact with the atmosphere when withdrawn from the mold.

Another object of the present invention is to provide apparatus by which repeated sterilization of a hollow needle after each blowing operation of a hollow body in a mold by means of injection of a sterile gas through said needle. The needle can occupy a sterilization position remote from the mold and a blowing position inside the mold and is movable from one position to the other under the control of appropriate means. According to the invention the needle as well as the supporting means therefore, when in the sterilization position, are raised to a sufficiently high temperature for a sufficiently long time for sterilization, while the inside of the needle is traversed by a gentle stream of sterile gas. During the period of travel of the sterile needle from the sterilization position to the blowing position, a gentle stream of sterile gas is maintained inside the needle.

When in the sterilization position, the hollow needle is retracted into a sterilization chamber and the needle and support means therefor are heated to temperature high enough to effect thorough sterilization. The inside bore of the needle is connected with a sterile gas source and is traversed by a stream of the gas. This may be sterile air. A low feed is satisfactory in this stage of the process. Advantageously, during the initial sterilization of the needle, a current of steam is passed therethrough so as to sterilize the entire blowing circuit.

When the necessary time for sterilization has passed, the feed of sterile air to the needle is increased so as to cool the walls thereof; this precaution prevents adherence of material to the needle when the latter pierces the preform to be blown.

To effect blowing, the sterile needle is introduced into a passage in the mold. During the travel of the needle from the sterilization position to the blowing position, it is advantageous to maintain a low feed of sterile air inside the sterile needle, so as not to produce turbulence which might cause contamination of the preform or of the mold by impurities from the atmosphere.

It is necessary that the passage in the mold in which the needle is introduced should also be sterile; this can be attained by blowing a sterilizing gas within said passage. The needle is supported in a collar provided with a shoulder which in the blowing position, provides a seal for the passage in the mold.

Blowing is effected with a sterile gas, such as air at a much higher pressure compared to that during the travel of the needle from the sterilization position to the blowing position.

After blowing, the needle is returned to its sterilization position inside the chamber to be made ready for a new cycle of operation.

BRIEF DESCRIPTION OF THE DRAWING

FIG. 1 is a schematic elevation view of the device in sterilization position; and FIG. 2 shows the same device in a blowing or injecting position.

DETAILED DESCRIPTION

Referring to the drawing therein is seen a hollow needle 1, which can be moved between a sterilization position as shown in FIG. 1 and a blowing position as shown in FIG. 2. In the sterilization position as seen in FIG. 1 the needle 1 is retracted inside a sterile chamber 2. The chamber 2 is provided with only one orifice 3 coaxially located with respect to the needle and allowing passage thereof between the retracted state in the sterilization position in FIG. 1 and the extended state in the injecting position in FIG. 2.

Chamber 2 has walls which are thermally insulated from the ambient atmosphere. Mounted at the inside wall of the chamber is an electrical heating resistance 4, whose temperature can be raised high enough to attain sterilization of the needle in a given time. The resistance 4 can be connected via a thermostat to a power supply (not shown).

The needle is engaged in a supporting collar 5 which can be be axially displaced by a jack (not shown) to move needle between the retracted and extended states. Connected to the collar 5 is a bellows 6 which serves as a seal between the collar and the interior of chamber 2. The bellows 6 can be constructed of stainless steel or laminated bronze with a thickness between 0.1 and 0.2 mm; or polytetrafluorethylene or silicone rubber.

The bore of the needle can be selectively placed into communication with a sterile air circuit 7 and a steam system 8. A trough 9 is disposed beneath chamber 2 to collect condensate when a first sterilization operation is effected with steam. A jack 10 is connected to chamber 2 to displace the chamber from the sterilization position above trough 9 to the injecting position above an inlet passage 11 of a mold 12.

In operation, the needle 1 is retracted into chamber 2 and is initially connected to the steam system 8 in the position shown in FIG. 1 so as to sterilize the entire blowing circuit. The system 8 is then disconnected from the needle and air circuit 7 is connected thereto to effect a gentle flow of sterile air through the needle as it is being heated to sterilization temperature within the chamber 2. After the needle has become sterilized, the flow of sterile gas through circuit 7 is increased to cool the needle and present adherence of the needle when it subsequently pierces the preform. The jack 10 is then activated to move the chamber 2 above mold 12. In the course of the movement of the chamber 2, a low feed of sterile air is maintained inside the needle. The needle is then extended and passes through passage 11 in mold 12 and pierces a preform in the mold while collar 5 seals passage 11. The feed in circuit 7 is then greatly increased and the needle injects sterile air into the preforming to expand the same against the walls of the mold and complete the blowing operation.

The invention can be implemented whatever the direction of the various elements forming the device and in particular whatever the direction of the needle. Moreover the invention is not limited to the case where the mold is stationary and the chamber mobile.

Machines for making the hollow bodies can have extremely high rates of operation, and hence the stay of the needle in the sterilization chamber may be too short to attain thorough sterilization. Therefore a plurality of sterilization chambers may be associated with a single mold, the different needles operating in such case in succession with the mold, as for example by successive rotation of the chambers in front of the mold. When one needle is in injecting position, the other needles are retracted and undergoing sterilization.

What is claimed is:

1. Apparatus for blow molding a preform in a mold with a sterile gas, said apparatus comprising a sterilization chamber, a hollow needle supported in said chamber for movement between a retracted position and an extended position, means for heating said chamber to a sterilization temperature, means for displacing said chamber between a sterilization position in which the needle is retracted and the chamber is heated to sterilization temperature and a second injecting position adjacent the mold whereat the needle can be extended to pierce a preform in the mold, and means for passing sterile gas through the needle.

2. Apparatus as claimed in claim 1 comprising means for passing steam through said needle in the sterilization position before the sterile gas is passed through the needle.

3. Apparatus as claimed in claim 2 comprising a trough positioned beneath said chamber in said sterilization position to receive steam condensate passed through said needle.

4. Apparatus as claimed in claim 1 wherein said chamber is provided with an aperture coaxial with said needle to permit passage thereof between the retracted and extended positions, said means for heating the chamber comprising electrical heating resistances in said chamber around said needles; and a bellows connecting said needle and chamber and serving to convey sterile gas to the needle in isolation from the interior of said chamber.

* * * * *